United States Patent
Gou et al.

(10) Patent No.: US 10,769,331 B2
(45) Date of Patent: Sep. 8, 2020

(54) VERIFICATION ALGORITHM ENGINE SELECTION

(71) Applicant: INTERNATIONAL BUSINESS MACHINES CORPORATION, Armonk, NY (US)

(72) Inventors: Peng Fei Gou, Shanghai (CN); Heng Liu, Shanghai (CN); Yang Fan Liu, Shanghai (CN); Yan Heng Lu, Shanghai (CN); Chen Qian, Shanghai (CN); Zhen Peng Zuo, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 137 days.

(21) Appl. No.: 16/033,417

(22) Filed: Jul. 12, 2018

(65) Prior Publication Data

US 2020/0019654 A1 Jan. 16, 2020

(51) Int. Cl.
*G06F 17/50* (2006.01)
*G06F 30/33* (2020.01)
(Continued)

(52) U.S. Cl.
CPC ............ *G06F 30/33* (2020.01); *G06F 30/327* (2020.01); *G06F 30/337* (2020.01);
(Continued)

(58) Field of Classification Search
None
See application file for complete search history.

(56) References Cited

U.S. PATENT DOCUMENTS 6,698,003 B2 * 2/2004 Baumgartner .......... G06F 30/33
716/103
6,842,750 B2 * 1/2005 Andreev ................. G06F 30/33
707/999.005

(Continued)

FOREIGN PATENT DOCUMENTS

CN 108664402 A * 10/2018

OTHER PUBLICATIONS

Michael Case, et al., Optimal Redundancy Removal Without Fixedpoint Computation, 2011, http://ieeexplore.ieee.org/abstract/document/6148883/, last visited Feb. 2, 2018, 3 pages, Abstract only.

(Continued)

*Primary Examiner* — Leigh M Garbowski
(74) *Attorney, Agent, or Firm* — Kunzler Bean & Adamson; Bruce R. Needham

(57) ABSTRACT

An apparatus for verification includes a processing module, a data collection module, an engine selection module and an engine execution module. The processing module processes a netlist using a plurality of engines. The netlist includes components and nodes of an integrated circuit design. Each engine includes an algorithm for verification of the integrated circuit design. The data collection module stores, for each engine, execution results for the engine for a plurality of netlists, the results stored in a history buffer. The engine selection module, for a current netlist, calculates using execution results in the history buffer which engine of the plurality of engines has a highest predicted performance and selects the engine with the highest predicted performance. The engine execution module executes the current netlist using the selected engine to produce execution results, reports the execution results and stores the execution results in the history buffer.

20 Claims, 8 Drawing Sheets

(51) Int. Cl.
*G06F 30/327* (2020.01)
*G06F 30/3323* (2020.01)
*G06F 30/337* (2020.01)
G06F 30/373 (2020.01)
G06F 30/367 (2020.01)
G06F 30/398 (2020.01)
G06F 30/30 (2020.01)
G06F 111/02 (2020.01)

(52) U.S. Cl.
CPC ......... *G06F 30/3323* (2020.01); *G06F 30/30* (2020.01); *G06F 30/367* (2020.01); *G06F 30/373* (2020.01); *G06F 30/398* (2020.01); *G06F 2111/02* (2020.01)

(56) References Cited

U.S. PATENT DOCUMENTS

| | | | |
|---|---|---|---|
| 7,260,799 B2 | 8/2007 | Baumgartner et al. | |
| 7,281,225 B2* | 10/2007 | Jain | G01R 31/31703 716/106 |
| 7,458,046 B2* | 11/2008 | Ghosh | G06F 30/3323 716/106 |
| 7,770,523 B2* | 8/2010 | Kovac | A63G 29/00 104/86 |
| 7,945,871 B2* | 5/2011 | Cobb | G06F 30/398 716/52 |
| 8,001,498 B2* | 8/2011 | Bjesse | G06F 30/3323 716/103 |
| 8,104,000 B2 | 1/2012 | Bjesse | |
| 8,327,302 B2 | 12/2012 | Baumgartner et al. | |
| 8,566,764 B2 | 10/2013 | Baumgartner et al. | |
| 8,589,837 B1 | 11/2013 | Baumgartner et al. | |
| 9,495,504 B2* | 11/2016 | Auerbach | G06F 30/398 |
| 10,366,330 B2* | 7/2019 | Yu | G06N 5/02 |
| 10,387,605 B2* | 8/2019 | Mneimneh | G06F 30/398 |
| 2005/0138474 A1* | 6/2005 | Jain | G01R 31/31703 714/30 |
| 2008/0244476 A1* | 10/2008 | Fotakis | G06F 30/30 716/132 |
| 2014/0330758 A1* | 11/2014 | Yu | G06N 5/02 706/12 |
| 2017/0024508 A1* | 1/2017 | Mneimneh | G06F 30/3323 |
| 2019/0121919 A1* | 4/2019 | Rafaila | G06F 30/3323 |

OTHER PUBLICATIONS

Jiazhao Xu, Enhanced Reachability Analysis Via Automated Dynamic Netlist-Based Hint Generation, http://ieeexplore.ieee.org/abstract/document/6462568/, last visited Feb. 2, 2018, 3 pages, Abstract only.

* cited by examiner

VERIFICATION ALGORITHM ENGINE SELECTION

BACKGROUND

The subject matter disclosed herein relates to circuit verification and more particularly relates to transformation-based verification engine selection.

Formal verification is a method of determining if logic of a circuit has any errors or bugs. Formal verification is implemented by converting a design of an integrated circuit ("IC") into a simpler "verifiable" format. A typical design is specified as set of interacting systems where each system has a finite number of states. States and transitions between states may constitute finite state machines ("FSMs"). A circuit can be represented by representing each component in terms of a present state (or current configuration) and a next state (or successive configuration). The circuit may be represented by discrete functions, which may be represented in a binary decision diagram ("BDD"), which is a data structure that represents Boolean functions and/or a multi-valued decision diagram ("MDD"), which is a data structure that represents finite valued discrete functions. Components of an integrated circuit diagram may be placed in a netlist, which includes a list of components, nodes or connection points of the components, and possibly attributes of the components involved. In one embodiment, the netlist includes sufficient information to transform the netlist into BDDs, MDDs or other logic structure useful for formal verification. Other formal verification methods may use satisfaction-based ("SAT-based") state enumeration.

Algorithms for checking for design errors in the integrated circuit design are often called engines or algorithm engines and use a netlist along with user constraints, initial conditions, etc. for determining is design errors are present, which may be called "reachability analysis." A design error, such as an inverter with an input and an output that are a same value, are considered to be bugs. Formal verification uses one or more engines to determine if design errors or bugs are present in the integrated circuit design.

Often a netlist is complex enough to require exorbitant computational resources so execution of one or more engines may take days or weeks, or may take a large amount of memory, etc. In general, there is no clear dependency between the structure or size of an analyzed circuit and required resources. However, a smaller number of registers, gates, arrays, etc. often results in increased computational performance. Transformation-based verification ("TBV") is a form of formal verification where some engines are used to simplify a netlist by reducing redundant gates, inputs, registers, arrays, constraints, etc. so that a resultant modified netlist may be used that requires less computational resources and/or executes in less time. Multiple engines may be used for processing a netlist where each engine has different characteristics. For example, some engines may be good at reducing inputs while other engines may be good at reducing registers, other engines may be good at reducing AND gates, other engines may excel at verifying there are no design errors for a particular netlist or components in the netlist, etc. Some formal verification computer programs may have access to thirty or more engines. Currently, engine selection is random or is by user experience, which may result in a very long verification process where other selected engines may have been used that would take less time and/or would use less computational resources.

SUMMARY

An apparatus for verification is disclosed. A computer-implemented method and computer program product also perform the functions of the apparatus. According to an embodiment of the present invention, the apparatus includes a processing module, a data collection module, an engine selection module and an engine execution module. The processing module processes a netlist using a plurality of engines. The netlist includes components and nodes of an integrated circuit design. Each engine includes an algorithm for verification of the integrated circuit design. The data collection module stores, for each engine, execution results for the engine for a plurality of netlists. The results are stored in a history buffer. The engine selection module, for a current netlist, calculates using execution results in the history buffer which engine of the plurality of engines has a highest predicted performance and selects the engine with the highest predicted performance. The engine execution module executes the current netlist using the selected engine to produce execution results, reports the execution results, and stores the execution results in the history buffer. In some embodiments, the modules include hardware circuits, a programmable hardware device and/or executable code, where the executable code is stored on one or more computer readable storage media.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
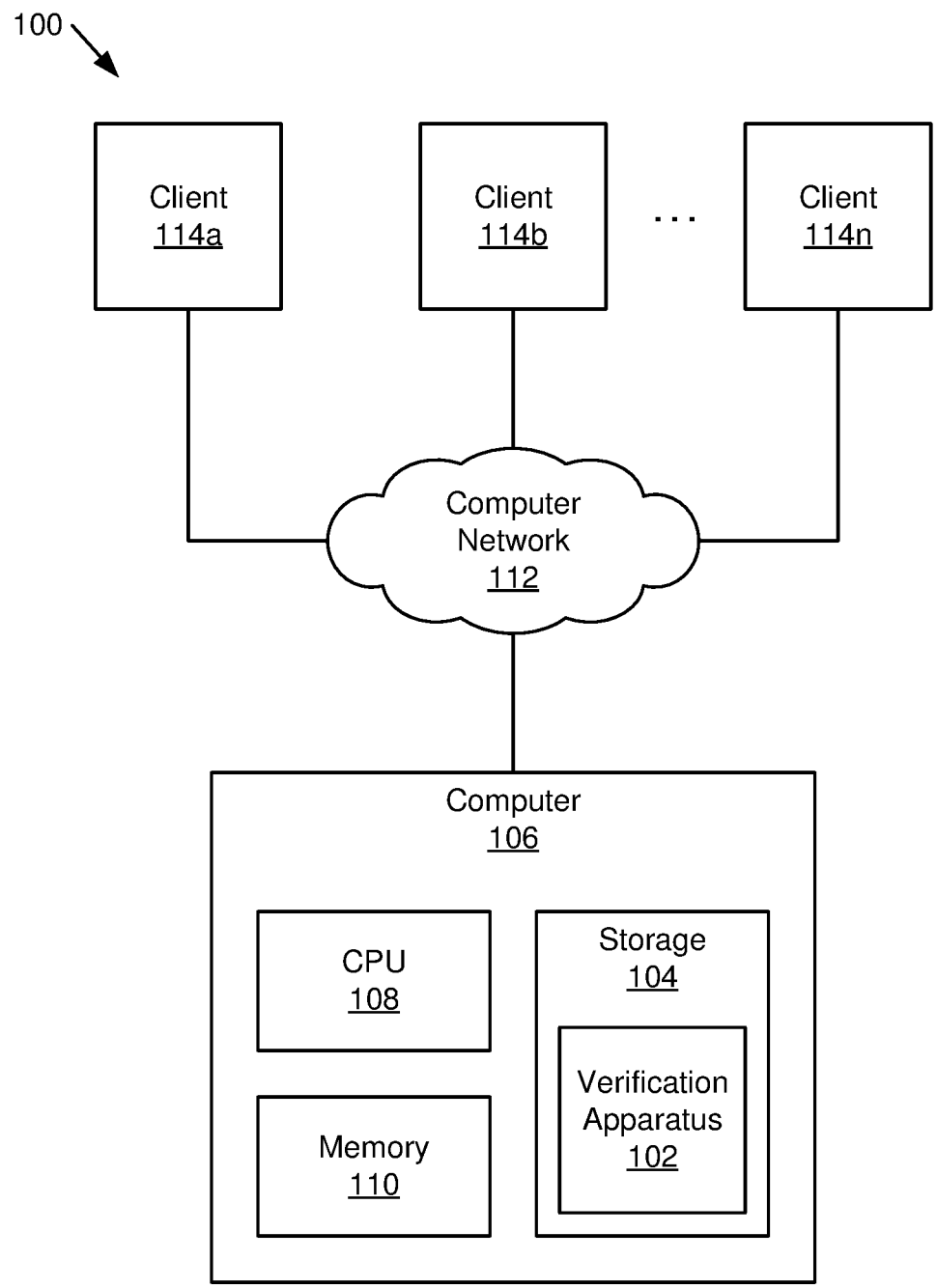
FIG. 1 is a schematic block diagram illustrating one embodiment of a system for verification.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software as executable code for execution by various types of processors. An identified module of program instructions may, for instance, comprise one or more physical or logical blocks of executable code which may, for instance, be organized as an object, procedure, or function. Nevertheless, the executable code of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

An apparatus for verification includes a processing module that processes a netlist using a plurality of engines. The netlist includes components and nodes of an integrated circuit design, and each engine includes an algorithm for verification of the integrated circuit design. The apparatus includes a data collection module that stores, for each engine, execution results for the engine for a plurality of netlists. The results are stored in a history buffer. The apparatus includes an engine selection module that, for a current netlist, calculates using execution results in the history buffer which engine of the plurality of engines has a highest predicted performance and selects the engine with the highest predicted performance. The apparatus includes an engine execution module that executes the current netlist using the selected engine to produce execution results, reports the execution results, and stores the execution results in the history buffer.

In some embodiments, execution results of the engine with the highest predicted performance includes a modified netlist and the apparatus includes a further processing module that uses, one or more times, a modified netlist from a previous engine execution, the engine selection module and the engine execution module to select an engine with a highest predicted performance for the modified netlist, executes the modified netlist with the selected engine, reports the execution results and stores the execution results to the history buffer. In other embodiments, one or more of the plurality of engines reduces a quantity of one or more parameters of the netlist and/or search possible conditions within the netlist and provide notification of a design error, validation of the integrated circuit design or notification that validation of the integrated circuit design is incomplete. In some embodiments, the further processing module terminates engine selection and execution in response to the engine execution module reporting execution results that indicate a validation of the integrated circuit design.

In some embodiments, the data collection module further includes an engine performance module that, for each engine, compiles in the history buffer engine output values from netlist execution results of an engine in an ordered list. Each ordered list includes an engine identifier, an engine output value for each output of the engine and/or a relationship. The relationship includes how the engine used for execution relates to one or more other engines. In other embodiments, the engine selection module includes an engine normalization module that, for the current netlist, averages the engine output values for one or more engines of the plurality of engines and the engine selection module selects an engine with a highest average as the engine with the highest predicted performance. In other embodiments, the engine normalization module averages each engine output value by normalizing each engine output value using a deduction ratio based on the engine output value of a netlist parameter of the execution results and an input value of the same netlist parameter from the current netlist used as input for the engine being executed.

In other embodiments, the engine selection module includes a machine learning module that modifies the normalized engine output values based on a machine learning inference algorithm and execution results in the history buffer. The machine learning inference algorithm modifies the normalized engine output values based on properties of netlists used as input for execution results in the history buffer, properties of the current netlist, available computing resources and/or execution time limits. In other embodiments, the engine output values include a number of registers, a number of gates, a number of inputs, a number of arrays, a number of constraints, execution time and/or memory used during execution.

A computer-implemented method for verification includes processing a netlist using a plurality of engines. The netlist includes components and nodes of an integrated circuit design, each engine comprising an algorithm for verification of the integrated circuit design. Each engine includes an algorithm for verification of the integrated circuit design. The computer-implemented method includes storing execution results for the engine for a plurality of netlists, the results stored in a history buffer and calculating, for a current netlist and using execution results in the history buffer, which engine of the plurality of engines has a highest predicted performance. The method includes selecting the engine with the highest predicted performance, executing the current netlist using the selected engine to produce execution results, reporting the execution results and storing the execution results in the history buffer.

In some embodiments, execution results of the engine with the highest predicted performance include a modified netlist and the method includes, one or more times, selecting an engine with a highest predicted performance for the modified netlist, executing the selected engine on the modified netlist, reporting the execution results in the history buffer and storing the associated execution results in the history buffer. In other embodiments, one or more of the engines used for processing a netlist reduce a quantity of one or more parameters of the netlist and/or search possible conditions within the netlist and provide notification of a design error, validation of the integrated circuit design or notification that validation of the integrated circuit design is incomplete. In other embodiments, the computer-implemented method includes terminating engine selection and execution in response to execution results comprising a validation of the integrated circuit design.

In some embodiments, storing execution results includes compiling in the history buffer, for each engine, output values from netlist execution results of an engine in an ordered list. Each ordered list includes an engine identifier, an engine output value for each output of the engine and/or a relationship. The relationship includes how the engine used for execution relates to one or more other engines. In other embodiments, selecting an engine with a highest predicted performance includes averaging, for the current netlist, the engine output values for one or more engines of the plurality of engines and selecting an engine with a highest average as the engine with the highest predicted performance. In other embodiments, averaging each engine output value includes normalizing each engine output value using a deduction ratio based on the engine output value of a netlist parameter of the execution results and an input value of the same netlist parameter from the current netlist used as input for the engine being executed. In other embodiments, the computer-implemented method includes modifying the normalized engine output values based on a machine learning inference algorithm and execution results in the history buffer. The machine learning inference algorithm modifies the normalized engine output values based on properties of netlists used as input for execution results in the history buffer, properties of the current netlist, available computing resources and/or execution time limits.

A computer program product for verification is described herein. The computer program product includes a computer readable storage medium having program instructions embodied therewith, where the program instructions are executable by a processor to cause the processor to process a netlist using a plurality of engines. The netlist includes components and nodes of an integrated circuit design, where each engine includes an algorithm for verification of the integrated circuit design. The program instructions cause the processor to store execution results for the engine for a plurality of netlists, the results stored in a history buffer, calculate, for a current netlist and using execution results in the history buffer, which engine of the plurality of engines has a highest predicted performance, select the engine with the highest predicted performance and execute the current netlist using the selected engine to produce execution results. The program instructions cause the processor to report the execution results and store the execution results in the history buffer.

In some embodiments, the program instructions causing the processor to store execution results include program instructions cause the processor to compile in the history buffer, for each engine, output values from netlist execution results of an engine in an ordered list. Each ordered list includes an engine identifier, an engine output value for each output of the engine and/or a relationship. The relationship includes how the engine used for execution relates to one or more other engines. In other embodiments, the program instructions causing the processor to store execution results include program instructions cause the processor to select an engine with a highest predicted performance include program instructions causing the processor to average, for the current netlist, the engine output values for one or more engines of the plurality of engines and to select an engine with a highest average as the engine with the highest predicted performance where averaging each engine output value includes normalizing each engine output value using a ratio of the engine output value to a common engine output value. In other embodiments, the program instructions causing the processor to store execution results include program instructions cause the processor to modify the normalized engine output values based on a machine learning inference algorithm and execution results in the history buffer, where the machine learning inference algorithm modifies the normalized engine output values based on properties of netlists used as input for execution results in the history buffer, properties of the current netlist, available computing resources and/or execution time limits.

FIG. 1 is a schematic block diagram illustrating one embodiment of a system 100 for verification. The system 100 includes a verification apparatus 102 in storage 104 of a computer 106, a central processing unit ("CPU") 108, memory 110, a computer network 112 and clients 114a, 114b, ... 114n (collectively or generically "114"), which are described below.

The system 100 includes a verification apparatus 102, which is used to determine an engine flow for verification of an integrated circuit design. In the depicted embodiment, the verification apparatus 102 is shown in storage 104 of the computer 106. In other embodiments, all or part of the verification apparatus 102 may be located elsewhere and may be implemented using hardware circuits, a programmable hardware device, executable code stored in a non-transitory computer readable storage medium, etc. For example, the verification apparatus 102 may be located in non-volatile storage 104, such as a hard disk drive, and all or a portion of the verification apparatus 102 may be read into the memory 110 as needed. In other embodiments, the verification apparatus 102 may be implemented using an FPGA or similar device. All or parts of the verification apparatus 102 may also be implemented using hardware circuits. In some embodiments, the verification apparatus 102 is a tool for verification. In another embodiment, the verification apparatus 102 is a plug-in or may be added to an existing verification tool.

The verification apparatus 102 processes netlists of an integrated circuit designs using a plurality of engines for verification of each integrated circuit design and stores execution results of each engine in a history buffer. The verification Apparatus 102 calculates, for a current netlist and using the history buffer, which engine has a highest predicted performance and selects the engine with the highest predicted performance. The verification apparatus 102 then executes the current netlist using the selected engine and reports the execution results and stores the execution results in a history buffer. The execution results include a modified netlist and the verification apparatus 102 repeats calculating the which engine has a highest predicted performance at each stage and executes a modified netlist using the currently selected engine until a program defect is found or until the integrated circuit design is validated. The verification apparatus 102 is described in more detail with regard to the apparatuses 200, 300 of FIGS. 2 and 3.

The computer 106, in various embodiments, may be a server, a workstation computer, a mainframe computer, a desktop computer, or other computer capable of transformation-based verification. The computer 106 may include one CPU 108 or multiple CPUs 108 where each CPU 108 may include multiple processors. In one embodiment, the computer 106 may include numerous blade servers controlled by a baseboard management controller ("BMC") or a mainframe computer with multiple processors. In some embodiment, the computer 106 may include two or more computers operating together, such as in a cloud computing environment. In other embodiments, the computer 106 may be desktop computer capable of execution of the verification apparatus 102. The computer 106, in one embodiment, is a dedicated purpose computer or machine, which may include an FPGA, PLA or other programable computing device. One of skill in the art will recognize other platforms for execution of the verification apparatus 102.

The computer 106 may include storage 104 of some type, such as a hard disk drive, optical storage, solid-state storage, etc. In some embodiments, the computer 106 is coupled to external storage, such as through a storage area network ("SAN"). The computer 106 includes memory 110, such as cache, RAM, etc. Formal verification, TBV, etc. may use a considerable amount of memory 110, which limits performance of the computer 106.

In some embodiments, the computer 106 is a server connected to one or more clients 114 through a computer network 112. The computer network 112 may include a LAN, a WAN, a fiber network, the Internet, a wireless network, or a combination of networks. A client 114 may be any form of computer capable of connecting to the server and may be used to control execution of the verification apparatus 102. One of skill in the art will recognize other computers 106 and computing environments appropriate for execution of the verification apparatus 102.

Figure 2:
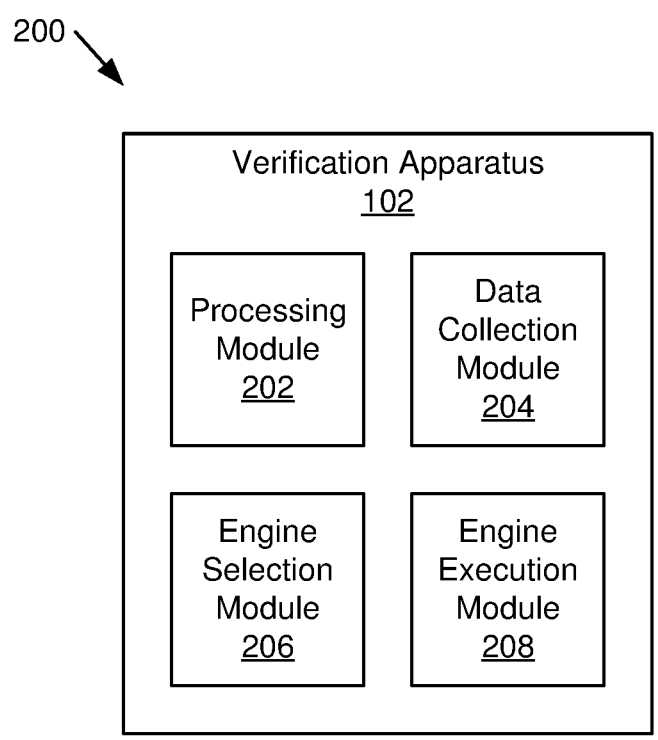
FIG. 2 is a schematic block diagram illustrating one embodiment of an apparatus for verification.

FIG. 2 is a schematic block diagram illustrating one embodiment of an apparatus 200 for verification. The apparatus 200 includes one embodiment of the verification apparatus 102 that includes a processing module 202, a data collection module 204, an engine selection module 206 and an engine execution module 208, which are described below.

The apparatus 200 includes a processing module 202 that processes a netlist using a plurality of engines. The netlist includes components and nodes of an integrated circuit design. In some embodiments, the netlist is an initial netlist. In other embodiments, the netlist is a modified netlist that is part of the execution results of an engine. The components of the netlist include devices that may be characterized using states or some other logical structure common to verification. For example, where the component is an AND gate, the netlist may include nodes for two inputs and a node for an output in a data structure. For example, the data structure may be a row of an array where a column in the array is to identify components, two columns are for inputs and a column is for an output. The component may include a type and an identifier where the type includes a category of the component (i.e. AND gate, OR gate, NAND gate, inverter, transistor, etc.) and the identifier may include an instance number for the component (e.g. AND003, component 237, or the like).

In some embodiments, the node is a number, a name, etc. that is common with another component to indicate a connection between the components. For example, a node may be identified as N487 and may be listed in the netlist as an output for a particular AND gate (e.g. AND003) and the name node identifier N487 may be listed in the netlist as an input for another component, such as an OR gate (e.g. OR041). A netlist may be a data structure that accommodates a variety of components, such as two-input components, three-input components, one-output components, two-output components, a base, emitter and collector of a bi-polar transistor, etc.

Each engine includes an algorithm for verification of the integrated circuit design. Each engine includes different characteristics and may be used for different purposes. For example, some engines may be useful for reduction of complexity of a netlist. Reduction engines may differ in that the reduction engines may be useful for different reductions. For example, a first reduction engine may be useful to reduce a number of registers and not as efficient for a reduction of gates where another engine may excel at reducing constraints but may be not as good for reducing registers. Some of the reduction engines may excel at reducing a netlist relatively quickly with relatively low computing resources, which may be suitable for processing an initial netlist to reduce complexity. Other engines may reduce complexity while searching possible conditions within the netlist to verify there are no design errors the integrated circuit design and to provide a validation of the integrated circuit design. Other engines may be useful for both reduction and searching. Some engines may be useful for large netlists where others may run slowly for a large netlist.

In one embodiment, a pool of engines for the verification apparatus 102 include 30 or more engines. In other embodiments, the number of engines available to the verification apparatus 102 is less than 30. For example, a select number of engines may be used for processing an initial netlist before results are stored in a history buffer. In one embodiment, the plurality of engines may include all available engines. In another embodiment, the plurality of engines includes a subset of available engines. The processing module 202 uses some or all of engines available in the pool of engines for processing the netlist.

The apparatus 200 includes a data collection module 204 that stores, for each engine, execution results for the engine for a plurality of netlists. The results are stored in a history buffer. In one embodiment, the data collection module 204 stores the execution results in a history buffer that is a data structure. For example, the data collection module 204 may store execution results of an engine in a row of an array. The row may include each output of the engine along with an identifier for the engine. In some embodiments, the data collection module 204 stores relationship information for the engine where the relationship information includes an indicator of a suitable engine to be a next engine for execution.

In another embodiment, the data collection module 204 stores the execution results in a format compatible for comparing to the execution results of other engines. For example, the execution results may be stored in the form of deduction ratios. For example, a netlist that is executed by an engine may have 100 AND gates and after execution by the engine a modified netlist of the execution results may include 80 AND gates resulting in a ratio of 0.8. Where a reduction of AND gates is desirable, a deduction ratio may be stored in the form of 1−0.8=0.2 where a higher deduction ratio indicates better performance of the engine. One of skill in the art will recognize other formats, data structures, etc. for storing execution results of an engine. The processing module 202 and data collection module 204 may be used many times with different netlists and different engines to build up a history buffer that is useful for selecting an engine with a highest predicted performance for a current netlist.

In other embodiments, the data collection module 204 stores additional information with execution results. In some examples, the data collection module 204 stores netlist properties of a netlist used as input for producing execution results. In other example, the data collection module 204 stores other conditions with execution results, such as execution time, memory usage, computing resources, and the like. One of skill in the art will recognize other information for the data collection module 204 to store with execution results.

The apparatus 200 includes an engine selection module 206 that, for a current netlist, calculates using execution results in the history buffer which engine of the plurality of engines has a highest predicted performance and selects the engine with the highest predicted performance. The engine selection module 206, in some embodiments, uses execution results in the history buffer to compares execution of available engines to select an engine with a highest predicted performance. In some embodiments, a larger number of execution results in the history buffer helps the engine selection module 206 to more accurately select an engine with a highest predicted performance. For example, the processing module 202 uses various netlists with different numbers of inputs, outputs, AND gates, registers, etc. for each of the plurality of engines and the data collection module 204 stores the execution results so that the engine selection module 206 may have a verification tool that is trained. A verification apparatus vendor may train the verification apparatus 102 so that customers verifying a particular netlist will have a large history buffer for the engine selection module 206.

The engine selection module 206 uses the calculations of various engines to select an engine with a highest predicted performance. The highest predicted performance, in some embodiments, is based on a scoring system where all of the outputs of each engine in the comparison are combined in a score for the engine and the engine selection module 206 compares the scores of the various engines. In some embodiments, outputs of a same type are formatted in a way to be compared. In some embodiments, the outputs of the engines are normalized with no particular output being highlighted or favored over other outputs. In another embodiment, a particular output or group of outputs maybe scaled, weighted, etc. to have more impact on a score of an engine so that the compared execution results are weighted toward one or more outputs. For example, a machine learning inference algorithm may provide weighting factors, scaling, etc. to modify deduction ratios based on certain goals, computing resources, and the like.

In one embodiment, the engine selection module 206 produces engine selection calculations in a way that a single engine is identified as the engine with the highest predicted performance for selection of the engine. In another embodiment, the engine selection module 206 produces engine selection calculations for the plurality of engines in a way so that an engine with a highest predicted performance is identified as a top ranked engine in a list of ranked engines where the ranking of the engine is based on a score for each engine. One of skill in the art will recognize other ways that the engine selection module 206 may calculate an engine with a highest predicted performance for selection.

The apparatus 200 includes an engine execution module 208 that executes the current netlist using the selected engine to produce execution results, reports the execution results and stores the execution results in the history buffer. For example, the engine execution module 208, in some embodiments, uses a current netlist as input for execution using the selected engine. In other embodiments, the engine execution module 208 uses additional inputs, such as inputs from a user, computing resource capacity, etc.

The engine execution module 208 reports execution results, for example, to a user. The execution results may be in a form useful to a user for determination of whether or not a design error was found, whether or not the engine validated the integrated circuit design, etc. In other embodiments, the engine execution module 208 reports execution results in a format useful for the verification apparatus 102 to decide whether or not to continue to another stage. For example, where the engine execution module 208 does not find a design error in the integrated circuit design or a validation of the integrated circuit design, the engine execution module 208 may initiate another round of engine selection by the engine selection module 206 engine execution by the engine execution module 208. In some embodiments, the engine execution module 208 sends a message to a user, to another program, etc. with the selected engine, execution results, netlist properties, etc. In another embodiment, the engine execution module 208 displays the selected engine and/or execution results on an electronic display coupled to the computer 106 or a client 114.

In one embodiment, the execution results of the selected engine include a modified netlist that differs from the netlist used by the processing module 202 to produce the execution results. The modified netlist may then be used by the processing module 202 in another round of execution. The engine execution module 208 stores execution results in the history buffer. The engine execution module 208, in some embodiments, stores execution results and other information, such as netlist properties of the executed netlist and a modified netlist resulting from the execution in the same way as during training by the processing module 202 and data collection module 204.

Figure 3:
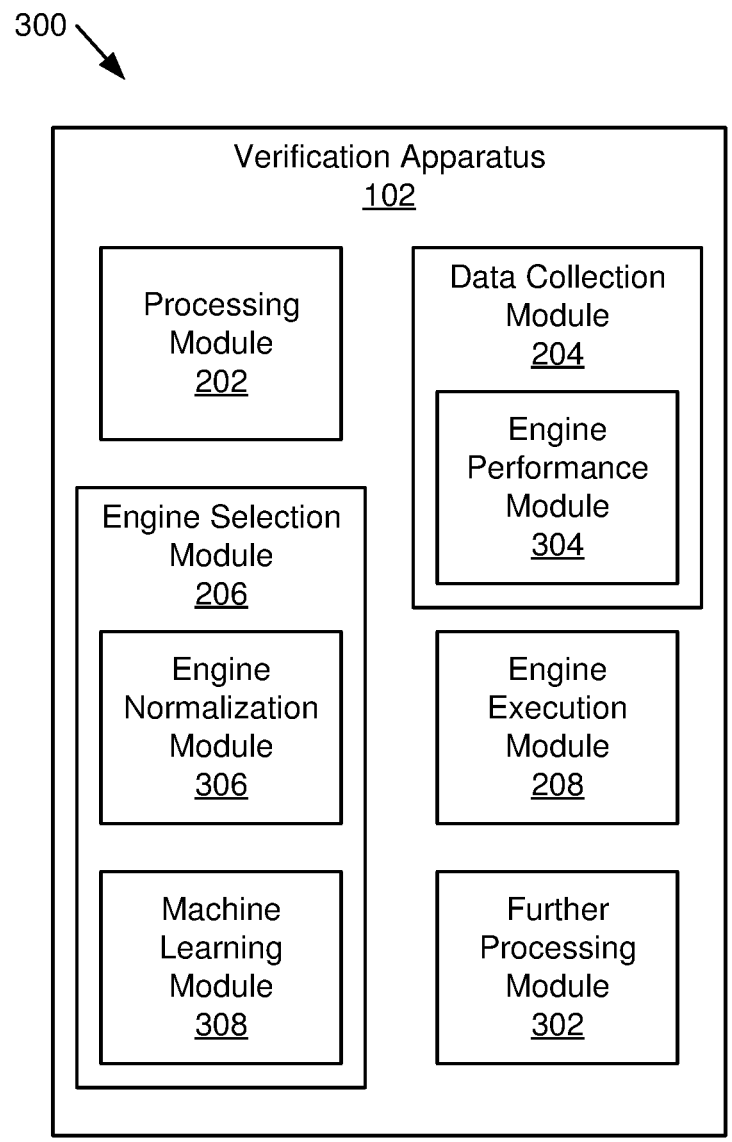
FIG. 3 is a schematic block diagram illustrating another embodiment of an apparatus for verification.

FIG. 3 is a schematic block diagram illustrating another embodiment of an apparatus 300 for verification. The apparatus 300 includes a processing module 202, a data collection module 204, an engine selection module 206 and an engine execution module 208, which, which are substantially similar to those described above in relation the apparatus 200 of FIG. 2. The apparatus 300, in various embodiments, includes one or more of a further processing module 302, an engine performance module 304, an engine normalization module 306 and a machine learning module 308, which are described below.

The apparatus 300 includes a further processing module 302 that uses, one or more times, a modified netlist from a previous engine execution, the engine selection module 206 and the engine execution module 208 to select an engine with a highest predicted performance for the modified netlist, executes the modified netlist with the selected engine, reports the execution results and stores the execution results to the history buffer. In other embodiments, the further processing module 302 reports and/or stores an execution sequence that includes a sequence of each engine with highest predicted performance and accompanying execution results.

For example, the engine execution module 208 processes an initial netlist of an integrated circuit design and selects an engine based on calculations from the history buffer. The engine execution module 208 then executes the initial netlist using the selected engine, reports the execution results and stores the execution results, including a modified netlist. The engine selection module 206 then calculates which engine has the highest predicted performance based on the modified netlist and selects the engine. The engine execution module 208 executes the modified netlist using the newly selected engine, reports the execution results and stores the execution results in the history buffer. The execution sequence, in some embodiments, are stored as part of the execution results to further enable the engine selection module 206 to select an engine with a highest predicted performance.

The execution sequence includes the order of selected engines where the selected engine of the first round is identified as a first selected engine, the selected engine of the second round is identified as the second selected engine, etc. The engine execution module 208, in some embodiments, reports execution results for all selected engines or may report execution results of the latest round, which may include a modified netlist for further processing or may also include a determination of whether or not the latest selected engine verified a bug exists in the integrated circuit design or verified there are no design errors in the integrated circuit design. The further processing module 302, in some embodiments, then initiates additional rounds using modified netlists of each preceding round. The further processing module 302 may stop when a bug is identified in execution results or may stop when design of the integrated circuit design is verified using a selected engine.

The apparatus 300, in some embodiments, includes an engine performance module 304 that, for each engine, compiles in the history buffer engine output values from netlist execution results of an engine in an ordered list. Each ordered list includes an engine identifier, an engine output value for each output of the engine and/or a relationship. The relationship includes how the engine used for execution relates to one or more other engines. In some examples, the relationship includes one or more engines that have been known to function well after execution of the particular engine.

The engine output values, in some embodiments, are normalized to be consistent with one another. In some examples, one engine includes an output value of a number of registers in the netlist where the output value is a change from a number of registers in the netlist used for execution. In one embodiment, engine performance module 304 takes an inverse of the ratio of resultant registers to initial registers. For example, the initial registers in the netlist used for execution, in one embodiment, is 20 registers and the register output of the engine has a value of 18 registers so 18 divided by 20 is 0.90. A user may consider a reduction of registers to be an advantage so the engine may perform better as the ratio of output registers to input registers decreases. However, when determining a highest predicted performance, a decrease may not be a best way to measure performance so the engine performance module 304 may subtract the ratio from 1. Thus, 1−(18/20) is 0.10, which may be stored by the data collection module 204 as the output value in the form of a deduction ratio. As the engine performs better and reduces registers, the register output value will also increase, which will contribute to a higher performance or higher score for the engine. The engine performance module 304, in some embodiments, adjusts each output value as appropriate to be normalized with other engine output values.

In one embodiment, the engine performance module 304 normalizes each engine output value by determining a deduction ratio of the engine output value to a common value. The common value, in some embodiments is an input value, a maximum number, a reference number, etc. In some embodiments, engines may express a common value with different numbers. For example, one engine may output a value on a scale from 1 to 10 where another engine may output a value on a scale from 1 to 100. The engine performance module 304 may then divide the first output value by 10 and the second output value by 100 so that the output values are comparable. Thus, the engine performance module 304 may customize output values of engines to be comparable to each other and may also customize output values of engines so that an increase is deemed beneficial and contributes to a highest predicted performance. In another embodiment, a highest predicted performance equates to a lowest score so that the engine performance module 304 normalizes each output value of each engine to decrease as performance increases.

In some embodiments, the common value is from the netlist used for execution. For example, if an engine output value is a netlist property, such as number of registers, from a modified netlist of execution results, the common value may be the number of registers from the netlist used for execution. The engine performance module 304 may then divide the number of registers from the modified netlist by the number of registers from the netlist used for execution. The engine performance module 304 may normalize the resultant ratio to be useful for selecting an engine. For example, where a reduction of registers is viewed as a positive result, the engine performance module 304 may use a formula such as 1−(output registers/input registers), which will result in a deduction ratio that indicates a better result as the deduction ratio increases.

In other embodiments, the engine performance module 304 may normalize other numbers to create deduction ratios, such as execution time, memory used, etc. For example, execution time may be divided by a reference number, which is subtracted from one to create a deduction ratio of execution time where a lower execution time results in a higher deduction ratio. One of skill in the art will recognize other ways that the engine performance module 304 may normalize engine output values to be comparable to each other.

The apparatus 300 includes an engine normalization module 306 that, for the current netlist, averages the engine output values for one or more engines of available engines where the engine selection module 206 selects an engine with a highest average as the engine with the highest predicted performance. In one embodiment, the engine normalization module 306 averages the engine output values for each engine. For example, if there are five engine output values for each engine, the engine normalization module 306 may sum the five engine output values and divide the sum by five. In other embodiments, the engine normalization module 306 creates a weighted average where some normalized engine output values are weighted heavier than other engine output values. For example, where a goal of a particular round is to reduce a number of AND gates, the engine normalization module 306 may multiply the normalized output value of an engine that corresponds to AND gates by a scaling factor, such as 1.5. The engine normalization module 306 may then sum the output values for an engine and divide by the total number of output values for the engine. The engine selection module 206 may then select a highest average output and associated engine as the selected engine. In some embodiments, the engine normalization module 306 averages each engine output value by normalizing each engine output value using a deduction ratio based on the engine output value of a netlist parameter of the execution results and an input value of the same netlist parameter from the current netlist used as input for the engine being executed.

The apparatus 300, in some embodiments, includes a machine learning module 308 that modifies the normalized engine output values based on a machine learning inference algorithm and execution results in the history buffer. Over time, the machine learning module 308 may recognize patterns that decrease execution time, result in a validation of an integrated circuit design, use less memory, etc. and then skews engine selection based on the recognized patterns. In some embodiments, the machine learning inference algorithm modifies the normalized engine output values based on properties of netlists used as input for execution results in the history buffer, properties of the current netlist, available computing resources and/or execution time limits. For example, the machine learning inference algorithm may detect that certain engines work better for netlists with certain properties and then skews results to select the engines when a current netlist has the same or similar properties. The machine learning inference algorithm, in some embodiments, recognizes that certain engines require less memory and may skew engine selection to select the engines that use less memory when less memory is available.

For example, the machine learning module 308 may use neural network encoding and may gather information from multiple circuits to learn over time which engines perform best under certain circumstances and also which execution sequence is best for particular circumstances, netlist characteristics, user constraints, etc. The machine learning module 308 may use artificial intelligence or other machine learning technique and may operate for a single integrated circuit design or for multiple integrated circuit designs.

Beneficially, the verification apparatus 102 provides a way to identify a predicted best engine for a particular netlist instead of relying on experience of a user to select an engine for execution at a particular stage. The verification apparatus 102, beneficially, improves performance of validation of integrated circuit designs because the verification apparatus 102 automatically selects an engine with a highest predicted performance at each stage, which helps to eliminate missing bugs due to picking an engine that doesn't perform as well. In addition, the verification apparatus 102 greatly improves validation of integrated circuit designs because once the verification apparatus 102 is trained, users, customers, etc. that engage in verification during qualification testing are able to greatly reduce execution time and required computational resources during the verification process.

Figure 4:
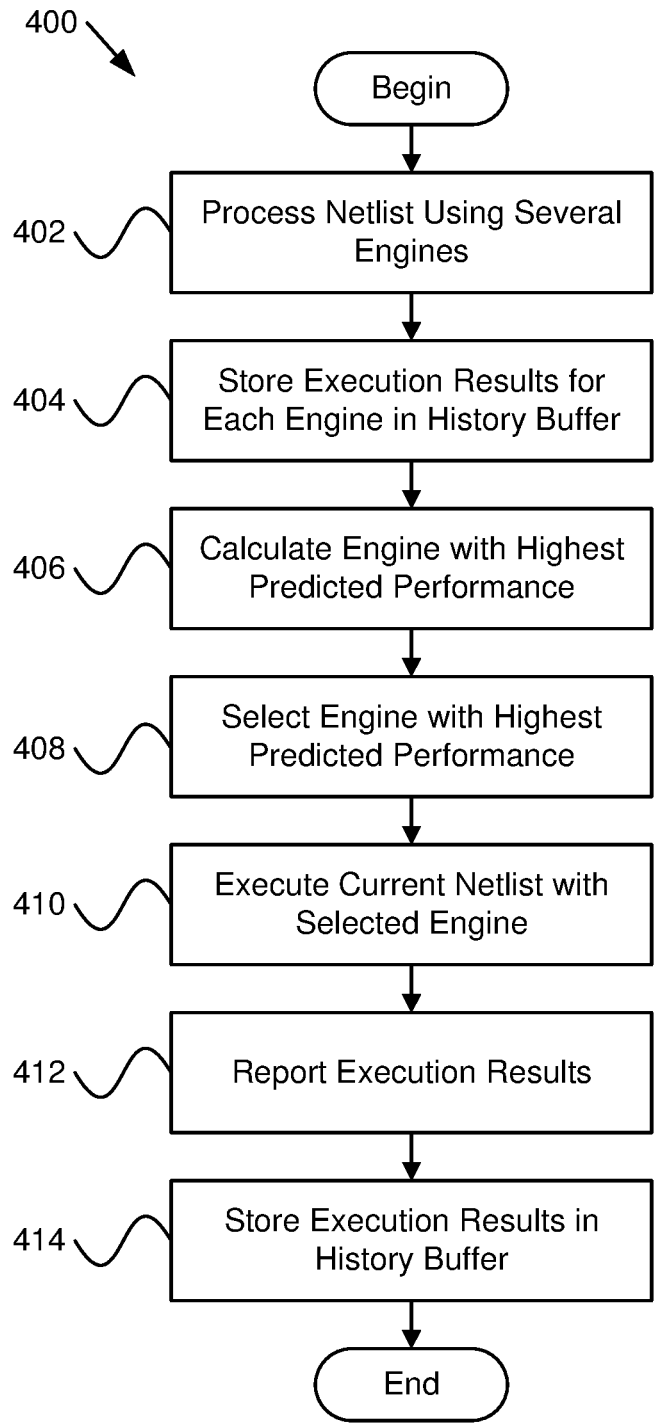
FIG. 4 is a schematic flow chart diagram illustrating one embodiment of a computer-implemented method for verification.

FIG. 4 is a schematic flow chart diagram illustrating one embodiment of a computer-implemented method 400 for integrated circuit design formal verification. The method 400 begins and processes 402 a netlist using a plurality of engines. The netlist includes components and nodes of an integrated circuit design. Each engine includes an algorithm for verification of the integrated circuit design. The method 400 stores 404, for each engine, execution results for the engine for a plurality of netlists where the execution results are stored in a history buffer. The method 400 calculates 406, for a current netlist and using execution results in the history buffer, which engine of the plurality of engines has a highest predicted performance and selects 408 the engine with the highest predicted performance. The method 400 executes 410 the current netlist using the selected engine to produce execution results, reports 412 the execution results and stores 414 the execution results in the history buffer, and the method 400 ends. In various embodiments, one or more of the processing module 202, the data collection module 204, the engine selection module 206 and the engine execution module 208 perform one or more steps of the computer-implemented method 400.

Figure 5:
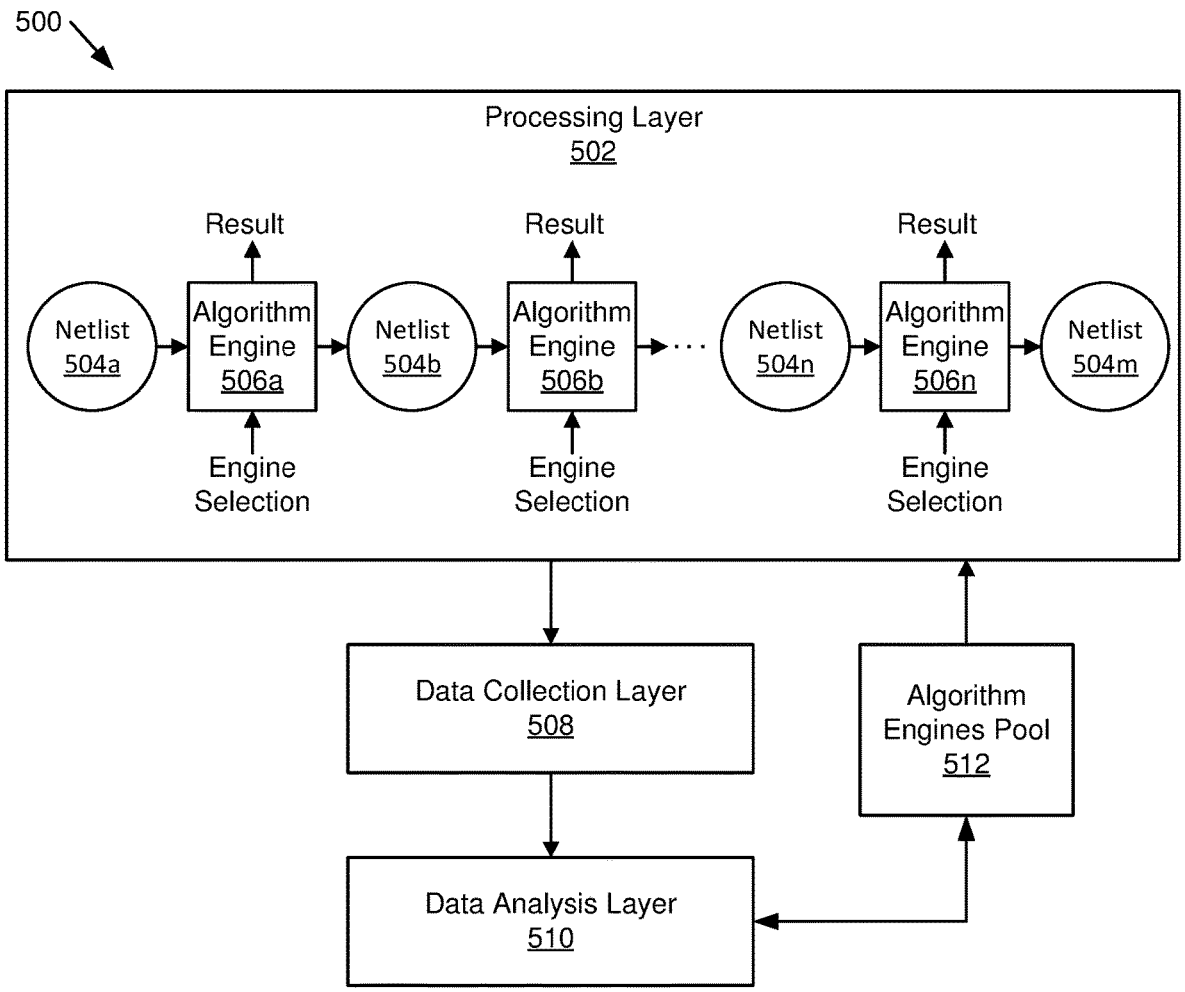
FIG. 5 is a schematic flow chart diagram illustrating another embodiment of a computer-implemented method for verification that includes a processing layer, a data collection layer and a data analysis layer.

FIG. 5 is a schematic flow chart diagram illustrating another embodiment of a computer-implemented method 500 for integrated circuit design verification that includes a processing layer 502, a data collection layer 508 and a data analysis layer 510. The method 500 also includes an algorithm engine pool 512, which includes the engines available to the processing layer 502.

The processing layer 502, in some embodiments, is a transformation-based verification ("TBV") processing layer that uses some engines to reduce complexity of a netlist before verification. The processing layer 502, which, in some embodiments, is implemented using the engine selection module 206, starts with a first netlist 504a as input to a selected algorithm engine 506a. (Note that "algorithm engine" and "engine" are used interchangeably herein.) The processing layer 502 repeats this first round for a multiple algorithm engines 506a. Each algorithm engine 506a in the first round produces different results, which are collected by the data collection layer 508. For example, execution results are stored in the history buffer in the data collection layer 508 by the data collection module 204 during training and/or by the engine execution module 208 during customer use. The data analysis layer 510 analyzes the results from the first algorithm engines 506a using the first netlist 504a and selects a first algorithm engine 506a with a highest predicted performance. In some embodiments, the engine selection module 206 is used for the data analysis layer 510.

The results from the first algorithm engine 506a with the highest predicted performance include a second netlist 504b, which is used for a second round with a plurality of second algorithm engines 506b. Again, results from the second algorithm engines 506b are gathered by the data collection layer 508 and analyzed by the data analysis layer 510 to select a second algorithm engine 506b with a highest predicted performance. The results of the second algorithm engine 506b include a third netlist 504c, which is used for a third round. The method 500 repeats n times and produces a final netlist 504m. The method 500 then reports an execution sequence of the selected algorithm engines 506a-n and associated results. The engine execution module 208, in some embodiments, reports the selected algorithm engines 506a-n and associated execution results.

Figure 6:
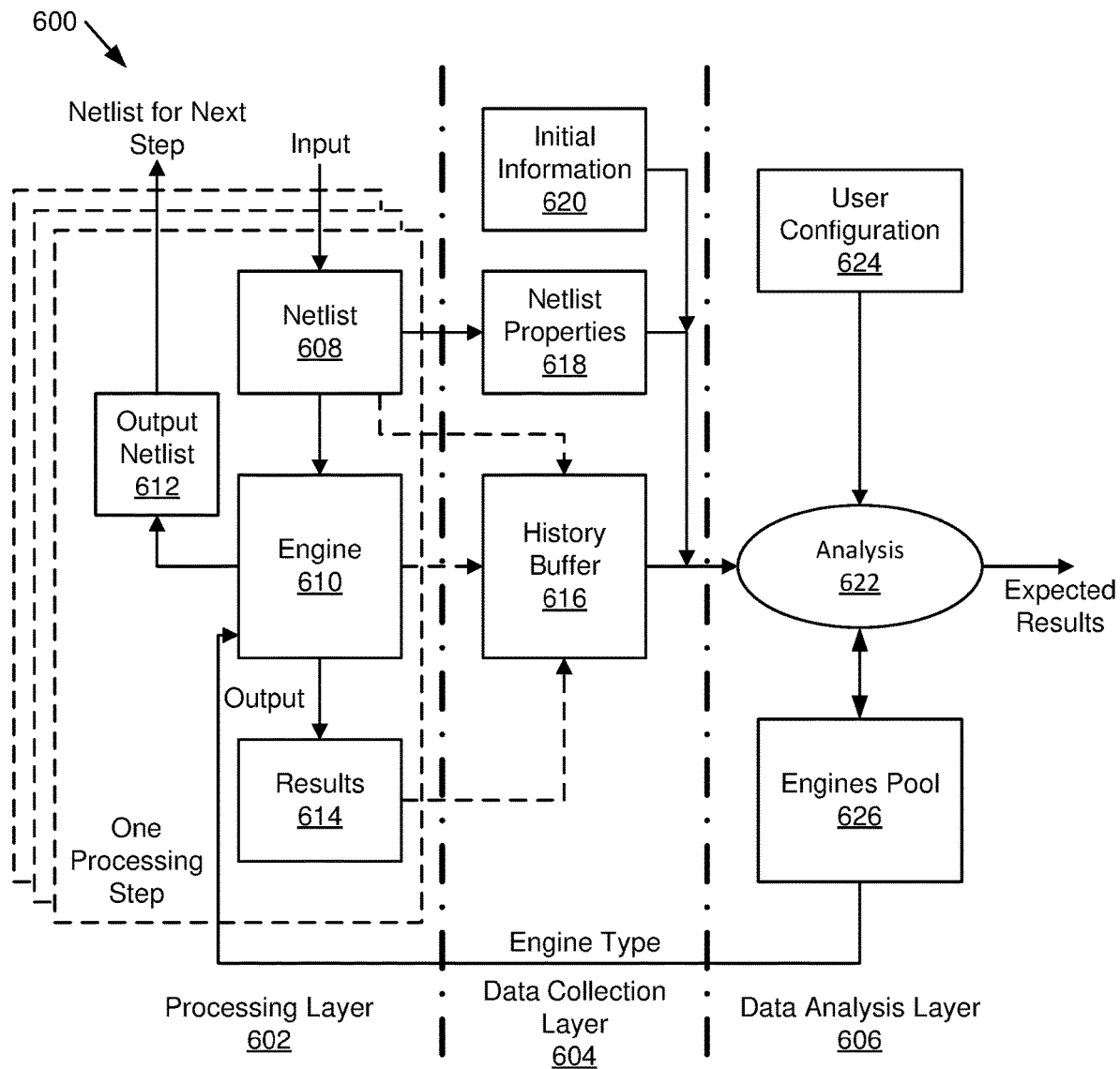
FIG. 6 is a schematic flow chart diagram illustrating a more complex embodiment of a computer-implemented method for verification that includes a processing layer, a data collection layer and a data analysis layer.

FIG. 6 is a schematic flow chart diagram illustrating a more complex embodiment of a computer-implemented method 600 for verification that includes a processing layer 602, a data collection layer 604 and a data analysis layer 606. The processing layer 602 includes a netlist 608. The netlist 608 is input by a user for a first round. The processing layer 602 includes an engine 610 that produces an output netlist 612 and results 614. The engine 610 that is used to produce the output netlist 612 is an engine 610 selected by the data analysis layer 606. The output netlist 612 is used as input for a netlist 608 for a next round or step. The results 614, in some embodiments, include a determination of whether or not a bug exists in the integrated circuit design used to produce the netlist 608 or verification that there are no design errors.

The results 614 are also fed to a history buffer 616 of the data collection layer 604. The netlist 608 from the processing layer 602 may also be used to extract netlist properties 618 in the data collection layer 604. Initial information 620 is also part of the data collection layer 604 and the initial information 620, netlist properties 618 and information from the history buffer 616 are used for analysis 622 along with a user configuration 624 within the data analysis layer 606 to select from the engines pool 626 an engine type to be used for a subsequent round.

Figure 7:
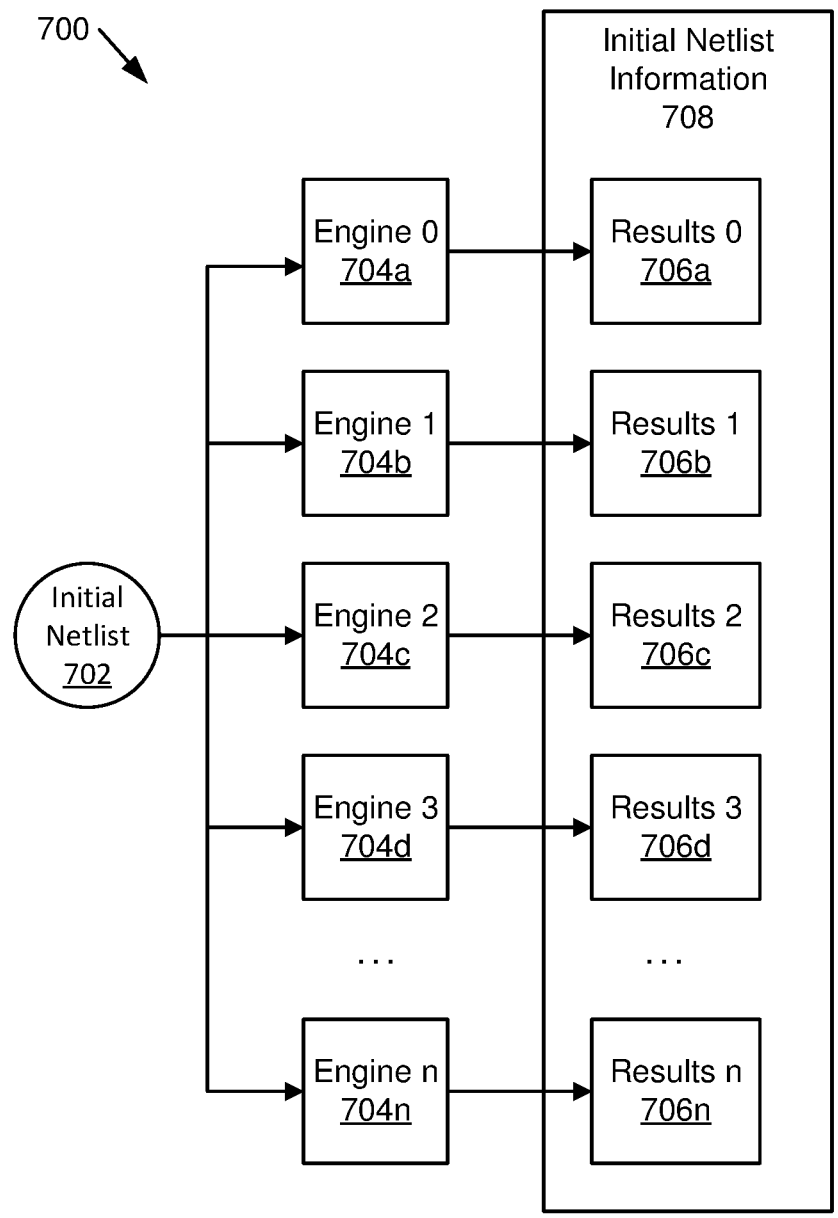
FIG. 7 is a schematic flow chart diagram illustrating using an initial netlist in various engines to obtain initial netlist information.

FIG. 7 is a schematic flow chart diagram 700 illustrating using an initial netlist 702 in various engines 704 to obtain initial netlist information 708. At the beginning of training of the verification apparatus 102, as the initial netlist 702 has no history buffer information, in some embodiments, a group of engines 704 may be used to process the initial netlist 702. The group of engines 704, in some embodiments, are lightweight engines that may be known to be robust for a complex netlist, may be known to use limited computational resources, may be known to execute complex netlists in a short amount of time, etc. Each engine (e.g. engine 0 704a) produces results (e.g. results 0 706a) that are fed into the initial netlist information 708 to be used by the data analysis layer 510, 606 to select an engine 704 with a highest predicted performance for subsequent modified netlists or other netlists from other integrated circuit designs. In some embodiments, a relationship of each engine 704 is analyzed along with execution results 706 to select an engine 704 with a highest predicted performance. In some embodiments, during training each time a new netlist for a new integrated circuit design is used the flow chart diagram of FIG. 7 is used. In other embodiments, during training the flowchart diagram 700 of FIG. 7 is used for a certain number of netlists for various integrated circuit designs.

In some embodiments, the engine performance module 304 normalizes each engine output value and the engine normalization module 306 normalizes the outputs for each engine 704 to produce a deduction ratio. The data analysis layer 510, 606 or engine selection module 206 selects the engine 704 with the highest deduction ratio as the selected engine with a highest predicted performance.

Figure 8:
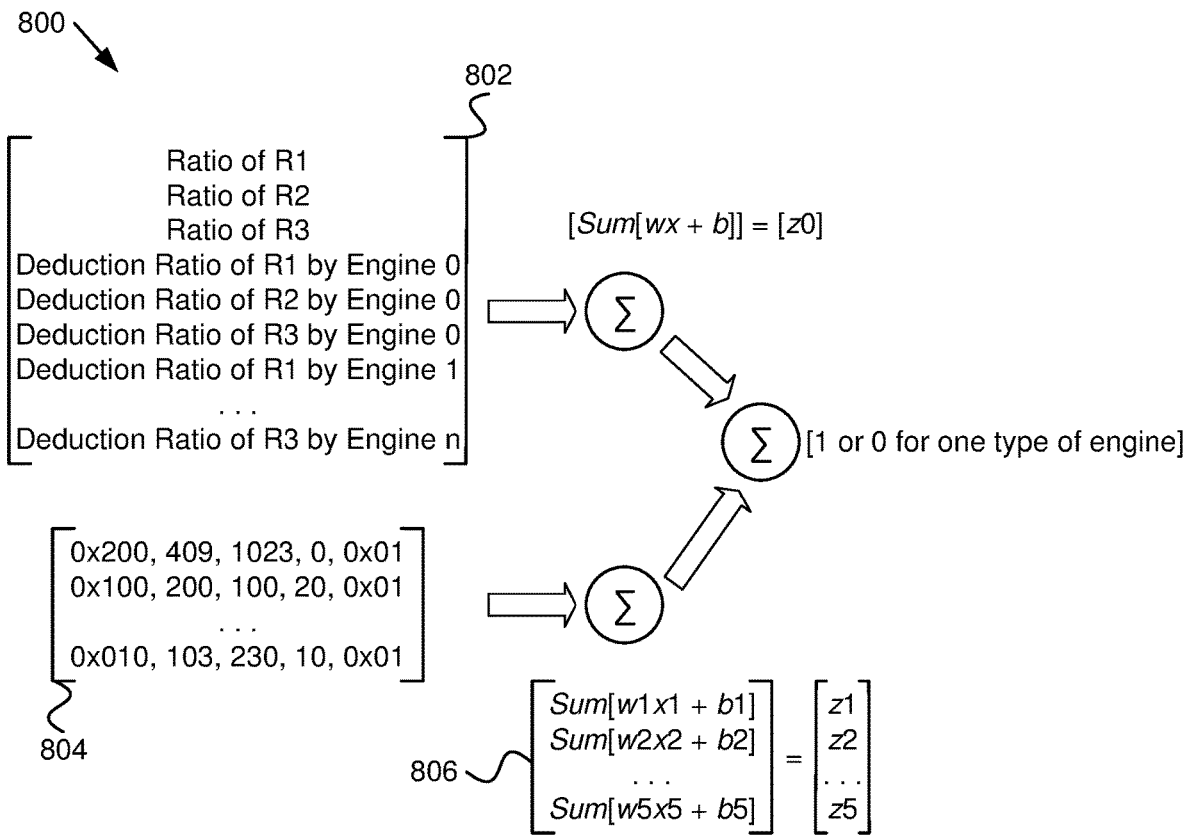
FIG. 8 is a schematic flow chart diagram illustrating using initial netlist information and execution results in a normalization process to determine which engine has highest predicted performance results.

FIG. 8 is a schematic flow chart diagram illustrating using initial netlist information 802 and execution results 804 in a normalization process 800 to determine which engine has highest predicted performance results. In some embodiments, the initial netlist information 802 properties are listed in one array. The example of FIG. 8 depicts three ratios of values R1, R2 and R3, which are initial netlist parameters that correspond to three engine output values. Three initial ratios and three engine output values are included for simplicity, but one of skill in the art will recognize that engines often produce additional output values. For example, there may be 5 (e.g. R1-R5) output values and the output values may correspond to a number of registers, a number of gates, a number of inputs, a number of arrays, a number of constraints, etc. A denominator for each initial ratio of R1, R2, R3 may a baseline value.

The initial netlist information 802 also includes deduction ratios of R1, R2 and R3 for each engine. For example, if initial ratio of R1 is a ratio of number of registers, engine 0 may change the number of registers and produce a different value, which may be labeled DR1. In some embodiments, the initial netlist information 802 corresponds to the initial netlist information 708 of FIG. 7.

The initial netlist information 802 may be used by the data analysis layer 510, 606 to select a first engine with a highest predicted performance, which may then be used to produce execution results 804 and a modified netlist, which are placed in an array. In one embodiment, the array of execution results 804 includes a row for each engine, which may be included in the first column. In one embodiment, the engine type is decoded as one-hot-encoding. For example, a ten-bit code may represent 10 engines, a 30-bit code may represent 30 engines, etc. In the array of execution results 804 of FIG. 8, each engine type is represented as a hexadecimal number (e.g. 0x200, 0x100, 0x010, etc.).

Deduction ratios maybe be normalized by the engine performance module 304 where each engine output value may be initially in a range of 0 to 1 with a range of 2047 when encoded. The deduction ratios may be encoded using an 11-bit binary number (e.g. 11b'00000000000 to 11b'11111111111). In the depicted example, the first deduction ratio for the first engine, represented by hexadecimal 0x200, may be 0.2, which may be encoded as decimal number 409 or binary number 11b'00110011001. The second deduction ratio for the first engine 0x200 may be 0.5, which is encoded as decimal 1023 or binary number 11b'01111111111. The third deduction ratio for the first engine 0x200 is 0, which is decimal 0 or binary number 11b'00000000000. The relationship for the engine may also be decoded using on-hot-encoding. In the array of execution results 804 of FIG. 8, the relationship is represented as hexadecimal 0x01, which may correspond to a particular engine, type of engine, etc.

The execution results 804 are represented in the summation blocks as x vectors. The machine learning module 308 may then modify the execution results by modifying other values in the matrixes, such as the w values and b values of a row or other alpha values multiplied by each row. One of skill in the art will recognize other formulations of matrices used by machine learning inference algorithms to train the verification apparatus 102.

The equations 806 are one example of neural network encoding. In some embodiments, the engine normalization module 306 may use the neural network encoding equations 806 along with the execution results 804 and initial netlist information 802 to output a 1 or 0 for each engine where one output would be a 1 that corresponds to the selected engine with the highest predicted performance. One of skill in the art will recognize other ways to use initial netlist information 802, execution results 804 from the processing layer 502, 602 and stored by the data collection layer 508, 604 to determine a selected engine with a highest predicted performance and an execution sequence of selected engines.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
   a processing module that processes a netlist using a plurality of engines, the netlist comprising components and nodes of an integrated circuit design, each engine comprising an algorithm for verification of the integrated circuit design, wherein at least a portion of the plurality of engines comprise a transformation-based verification ("TBV") engine that simplifies the netlist by reducing redundant elements;

a data collection module that stores, for each engine, execution results for the engine for a plurality of netlists, the results stored in a history buffer;

an engine selection module that, for a current netlist, calculates using execution results in the history buffer which engine of the plurality of engines has a highest predicted performance and selects the engine with the highest predicted performance; and an engine execution module that executes the current netlist using the selected engine to produce execution results, reports the execution results, and stores the execution results in the history buffer, wherein said modules comprise one or more of hardware circuits, a programmable hardware device and executable code, the executable code stored on one or more computer readable storage media.

2. The apparatus of claim 1, wherein execution results of the engine with the highest predicted performance comprises a modified netlist and further comprising a further processing module that uses, one or more times, a modified netlist from a previous engine execution, the engine selection module and the engine execution module to select an engine with a highest predicted performance for the modified netlist, executes the modified netlist with the selected engine, reports the execution results and stores the execution results to the history buffer.

3. The apparatus of claim 2, wherein one or more of the plurality of engines one or more of:
reduce a quantity of one or more parameters of the netlist; and
search possible conditions within the netlist and provide one of:
notification of a design error;
validation of the integrated circuit design; and
notification that validation of the integrated circuit design is incomplete.

4. The apparatus of claim 3, wherein the further processing module terminates engine selection and execution in response to the engine execution module reporting execution results that indicate a validation of the integrated circuit design.

5. The apparatus of claim 1, wherein the data collection module further comprises an engine performance module that, for each engine, compiles in the history buffer engine output values from netlist execution results of an engine in an ordered list, each ordered list comprising one or more of an engine identifier, an engine output value for each output of the engine and a relationship, the relationship comprising how the engine used for execution relates to one or more other engines.

6. The apparatus of claim 5, wherein the engine selection module further comprises an engine normalization module that, for the current netlist, averages the engine output values for one or more engines of the plurality of engines and wherein the engine selection module selects an engine with a highest average as the engine with the highest predicted performance.

7. The apparatus of claim 6, wherein the engine normalization module averages each engine output value by normalizing each engine output value using a deduction ratio based on the engine output value of a netlist parameter of the execution results and an input value of the same netlist parameter from the current netlist used as input for the engine being executed.

8. The apparatus of claim 6, wherein the engine selection module further comprises a machine learning module that modifies the normalized engine output values based on a machine learning inference algorithm and execution results in the history buffer, wherein the machine learning inference algorithm modifies the normalized engine output values based on one or more of:
properties of netlists used as input for execution results in the history buffer;
properties of the current netlist;
available computing resources; and
execution time limits.

9. The apparatus of claim 5, wherein the engine output values comprise one or more of a number of registers, a number of gates, a number of inputs, a number of arrays, a number of constraints, execution time and memory used during execution.

10. A computer-implemented method for verification comprising:
processing a netlist using a plurality of engines, the netlist comprising components and nodes of an integrated circuit design, each engine comprising an algorithm for verification of the integrated circuit design, wherein at least a portion of the plurality of engines comprise a transformation-based verification ("TBV") engine that simplifies the netlist by reducing redundant elements;
storing, for each engine, execution results for the engine for a plurality of netlists, the results stored in a history buffer;
calculating, for a current netlist and using execution results in the history buffer, which engine of the plurality of engines has a highest predicted performance;
selecting the engine with the highest predicted performance;
executing the current netlist using the selected engine to produce execution results;
reporting the execution results; and
storing the execution results in the history buffer.

11. The computer-implemented method of claim 10, wherein execution results of the engine with the highest predicted performance comprise a modified netlist and further comprising, one or more times,
selecting an engine with a highest predicted performance for the modified netlist;
executing the selected engine on the modified netlist;
reporting the execution results in the history buffer; and
storing the associated execution results in the history buffer.

12. The computer-implemented method of claim 11, wherein one or more of the engines used for processing a netlist
reduce a quantity of one or more parameters of the netlist; and
search possible conditions within the netlist and provide one of:
notification of a design error;
validation of the integrated circuit design; and
notification that validation of the integrated circuit design is incomplete.

13. The computer-implemented method of claim 11, further comprising terminating engine selection and execution in response to execution results comprising a validation of the integrated circuit design.

14. The computer-implemented method of claim 10, wherein storing execution results further comprises compiling in the history buffer, for each engine, output values from netlist execution results of an engine in an ordered list, each ordered list comprising one or more of an engine identifier, an engine output value for each output of the engine and a relationship, the relationship comprising how the engine used for execution relates to one or more other engines.

15. The computer-implemented method of claim 14, wherein selecting an engine with a highest predicted performance further comprises averaging, for the current netlist, the engine output values for one or more engines of the plurality of engines and selecting an engine with a highest average as the engine with the highest predicted performance.

16. The computer-implemented method of claim 15, wherein averaging each engine output value comprises normalizing each engine output value using a deduction ratio based on the engine output value of a netlist parameter of the execution results and an input value of the same netlist parameter from the current netlist used as input for the engine being executed.

17. The computer-implemented method of claim 16, further comprises modifying the normalized engine output values based on a machine learning inference algorithm and execution results in the history buffer, wherein the machine learning inference algorithm modifies the normalized engine output values based on one or more of:
   properties of netlists used as input for execution results in the history buffer;
   properties of the current netlist;
   available computing resources; and
   execution time limits.

18. A computer program product for verification, the computer program product comprising a computer readable storage medium having program instructions embodied therewith, the program instructions executable by a processor to cause the processor to:
   process a netlist using a plurality of engines, the netlist comprising components and nodes of an integrated circuit design, each engine comprising an algorithm for verification of the integrated circuit design, wherein at least a portion of the plurality of engines comprise a transformation-based verification ("TBV") engine that simplifies the netlist by reducing redundant elements;
   store execution results for the engine for a plurality of netlists, the results stored in a history buffer;
   calculate, for a current netlist and using execution results in the history buffer, which engine of the plurality of engines has a highest predicted performance;
   select the engine with the highest predicted performance;
   execute the current netlist using the selected engine to produce execution results;
   report the execution results; and
   store the execution results in the history buffer.

19. The computer program product of claim 18, wherein execution results of the engine with the highest predicted performance comprises a modified netlist and the program instructions further cause the processor to, one or more times,
   select an engine with a highest predicted performance for the modified netlist;
   execute the selected engine on the modified netlist;
   report the execution results in the history buffer; and
   store the associated execution results in the history buffer.

20. The computer program product of claim 18, wherein the program instructions causing the processor to store execution results further comprise program instructions cause the processor to
   compile in the history buffer, for each engine, output values from netlist execution results of an engine in an ordered list, each ordered list comprising one or more of an engine identifier, an engine output value for each output of the engine and a relationship, the relationship comprising how the engine used for execution relates to one or more other engines;
   select an engine with a highest predicted performance further comprises program instructions causing the processor to average, for the current netlist, the engine output values for one or more engines of the plurality of engines and to select an engine with a highest average as the engine with the highest predicted performance wherein averaging each engine output value comprises normalizing each engine output value using a ratio of the engine output value to a common engine output value; and
   modify the normalized engine output values based on a machine learning inference algorithm and execution results in the history buffer, wherein the machine learning inference algorithm modifies the normalized engine output values based on one or more of:
   properties of netlists used as input for execution results in the history buffer;
   properties of the current netlist;
   available computing resources; and
   execution time limits.

* * * * *